Patented July 26, 1932

1,868,565

UNITED STATES PATENT OFFICE

GERALD C. CONNOLLY, OF BALTIMORE, MARYLAND, ASSIGNOR TO THE SILICA GEL CORPORATION, OF BALTIMORE, MARYLAND, A CORPORATION OF MARYLAND

PROCESS OF PREPARING ADSORBENT MATERIALS

No Drawing.   Application filed November 22, 1930. Serial No. 497,606.

The present invention relates to processes of preparing highly porous solid adsorbent materials.

Among the solid adsorbents most commonly employed in industry are solid porous gel materials and activated carbon. Those gases or vapors which wet these materials are more efficiently adsorbed than those that do not. Water vapor wets silica gel easily whereas hydrocarbon vapors do not. On the contrary, activated carbon is more easily wetted by hydrocarbon vapors so that, from a mixture of water vapor and hydrocarbon vapors, silica gel will adsorb the water vapor in preference to the hydrocarbon whereas activated carbon will adsorb the hydrocarbon vapors in preference to the water vapor.

In the handling and transfer of activated carbon in commercial processes wherein it is employed as the adsorbent material, some "fines" are formed. They are also produced in the manufacture of the activated carbon. "Fines" are the small particles broken off from the larger particles, and have the same properties and physical characteristics as the larger particles except for the difference in size. Because of their minuteness, the "fines" of activated carbon are restricted in their use as adsorbents to very special purposes, and ofttimes are incapable of being used at all.

The principal object of the present invention is to provide a process of converting such "fines" into industrially valuable highly adsorbent materials.

Another object of the present invention is to provide a process of preparing a highly adsorbent material having the adsorption properties of both activated carbon and gels in a simple and expeditious manner.

Briefly stated, the process according to the present invention, comprises incorporating the "fines" of activated carbon in an inorganic gel forming mass, and then converting the said mass into a hard, highly porous, adsorbent material. By the term "gel forming mass" is meant either the initial ingredients employed in making the gel, the reaction mass or sol formed by mixing the ingredients together, or the gelatinous precipitate and/or the hydrogel which is formed by the coagulation of the sol as a whole.

The gel forming mass employed may be either the initial ingredients used in the making of gels of silica, tungstia, titania, alumina, stannia, or plural gels consisting of two or more of said oxides, or the sols or gelatinous precipitates and/or hydrogels of any one of said oxides or mixtures of said oxides.

The amount and the size of the "fines" of activated carbon used control or determine the character of the final product as regards tenacity and rigidity. To obtain a satisfactory product it is a prerequisite that the "fines" be in an extremely fine state of subdivision, preferably finer than 300 mesh, and that they be present in the final product in an amount not exceeding 25% by volume of said product. If "fines" of a coarser mesh, say 10–20 mesh, are taken in an amount such as to not exceed 25% of the final product, it will exhibit such a slight degree of rigidity as to disintegrate into a powder upon the slightest application of pressure. Where the "fines" of a size finer than 300 mesh are used but in an amount of say 50% by volume of the final product, the product will also be unsatisfactory as regards rigidity. For the best product, it is preferable to use "fines" of a size finer than 300 mesh, and in an amount of about 10% to 20% by volume of the end product.

Several specific examples of processes of preparing the adsorbent according to the present invention are as follows:

Example 1

500 cc. of a water glass solution of a specific gravity of 1.185 are gradually added, with vigorous agitation to 500 cc. of an acid solution such as hydrochloric acid. Sulphuric acid or other acids of proper strength may be used in place of hydrochloric acid. A silicic acid sol forms which has an acidity of about 0.5 N.

Activated carbon "fines" of a size finer than 300 mesh in the desired amount, say about 15% by volume of the $SiO_2$ content of the sol, are added to the sol, and thoroughly incorporated therein. During the addition of the "fines" to the sol, the sol should be subjected to vigorous agitation, the agitation being continued until the viscosity increases sufficiently that the "fines" will not settle. After the incorporation of the "fines" in the sol, the mass is allowed to remain quiescent, whereupon, after a time it sets as a whole to a jelly or hydrogel.

If desired, the activated carbon "fines" in the desired amount may be incorporated in either the acid or silicate solutions, and the two solutions then mixed in the same manner as previously described.

The hydrogel is broken into pieces and washed thoroughly with water. It is then dehydrated to a 10% to 15% water content as by heating to a temperature of about 120° C. and above.

Example 2

A silicic acid sol is prepared in the same manner as described in Example 1 and allowed to set to a hydrogel without incorporating activated carbon "fines" therein. The hydrogel is then mixed with activated carbon "fines" in the desired amount, for example about 20% by volume of the $SiO_2$ content of the hydrogel. The mixture is then subjected to pressure so as to thoroughly incorporate the "fines" in the pieces of the hydrogel. This may be done by either extruding the mixture or compressing same. The hydrogel is then nearly dehydrated in the same manner as in Example 1.

Example 3

To 1000 cc. of sodium titanate in a solution of hydrochloric acid (total acidity 1.89 normal) containing 145 grams as $TiO_2$ is added with constant agitation about 1560 to 1580 cc. of a 4.34 normal sodium hydroxide solution. As the sodium hydroxide is added an intermediate gelatinous precipitate forms which redissolves on the further addition of hydroxide with agitation. The resulting sol has an alkalinity of about 1.869 to 1.926 normal.

Activated carbon "fines" of a size finer than 300 mesh in the desired amount, say about 20% by volume of the titanium oxide content of the mixture, are stirred into the reaction mass or sol, the stirring being continued until the viscosity increases sufficiently that the "fines" will not settle.

The mixture sets to a hydrogel, which is broken into pieces, and washed by decantation until it is practically free of chlorides, whereupon it is filtered, as by suction in a thin layer spread over a comparatively large area.

The washed hydrogel is dehydrated to a 10% to 15% water content as by heating, first at a temperature around 100° C. or a little higher, followed by further heating of a temperature of 150° to 200° C. for about 2 hours.

Example 4

50 cc. of titanium tetrachloride, which is a liquid under normal room conditions of temperature and pressure, is poured over ice until it is diluted to a volume of about 1200 cc. This is then triturated with careful and constant stirring with a 2 normal alkali solution such as sodium hydroxide, to the point of greatest consistency, and at this point the acidity of the mixture is about 0.005 N. This point is easily noted by the use of Brom-phenol-blue as an indicator. A gelatinous precipitate forms which is washed thoroughly with water.

The precipitate is mixed with activated carbon "fines" in the desired amount, for example about 20% by volume of the titanium oxide content of the precipitate. The mixture is then subjected to pressure and dried in the same manner as described in Example 2.

Example 5

A solution of an acid, such as hydrochloric or sulphuric acid, is added to a solution of sodium tungstate of about 3% to 8% strength with stirring until a precipitate is formed. This requires only a small amount of acid. The reaction mass is then stirred until this precipitate dissolves whereupon more acid is added, the total amount of acid used being such as to allow a final acidity of the whole mixture after reaction equal to about 0.1 to 0.5 mols per liter. This acidity is such that the sol or mixture will set to a hydrogel in about 4 to 30 minutes at room temperature.

The desired amount of activated carbon "fines" is say about 15% of the tungsten oxide content of the sol or mixture, is added with stirring to the reaction mixture or sol. If the proportions of the ingredients are such that the sol begins to set before the "fines" can be thoroughly stirred into the mixture then the ingredients should be mixed at a lower temperature, say 10° to 15° C. The tungstate and acid solutions may be mixed together in almost any manner desired, for example, by flowing streams of each into a stirring apparatus, provided that an excess of the tungstate solution over the acid is present during the first part of the mixing step.

The hydrogel into which the sol or mixture sets is rather soft and must be washed carefully. It is broken into pieces and washed free from acid and salt.

The washed hydrogel is now carefully dried as by heating in a stream of air at 75° to 120° C. In this manner the hydrogel is dehydrated to a water content of 10% to 15% of the weight of the dried gel.

Example 6

A sol of silica is prepared in the same manner as described in Example 1.

A sol of tungstia is prepared in the same manner as described in Example 5.

The sols of silica and tungstia are then mixed together. To this mixture of sols is then added activated carbon "fines" in the desired amount. If desired, the activated carbon "fines" may be incorporated in either of the sols of silica or tungstia and the two sols then mixed together. The mixed sol, after a time sets to a hydrogel.

The hydrogel is broken into pieces, washed, and dried in the same manner as described in Example 1.

The products obtained by the processes described in these examples are hard, highly porous, vitreous gels having activated carbon in the pores thereof and have the properties of both gels and adsorbent carbon in that they will adsorb hydrocarbon vapors of low boiling points as well as water vapor. In other words, the product according to the invention has some of the properties of both gels and activated carbons.

Having thus described the invention, what is claimed as new and desired to be secured by Letters Patent is:

1. The process of preparing an adsorbent material consisting in incorporating activated carbon "fines" of a size finer than 300 mesh in an inorganic oxide gel forming mass, the amount of "fines" being such as to not exceed 25% of the oxide content of the gel forming mass, and then converting the said mass into a hard, porous gel.

2. The process according to claim 1 wherein the gel forming mass includes silica.

3. The process of preparing an adsorbent material consisting in preparing an inorganic oxide sol which sets to a hydrogel, incorporating activated carbon "fines" of a size finer than 300 mesh in said sol, the amount of "fines" being such as to not exceed 25% of the oxide content of the sol, and converting the hydrogel into a hard, porous gel.

4. The process according to claim 3 wherein the inorganic sol includes silica.

5. The process of preparing an adsorbent material consisting in incorporating activated carbon "fines" of a size finer than 300 mesh in an inorganic oxide hydrogel, the amount of "fines" being such as to not exceed 25% of the oxide content of the hydrogel, and converting the hydrogel into a hard, porous gel.

6. The process according to claim 5 wherein the inorganic hydrogel includes silica.

7. The process of preparing an adsorbent material consisting in mixing with vigorous agitation activated carbon "fines" of a size finer than 300 mesh and solutions of substances capable of reacting to form a liquid inorganic oxide gel forming mass, the concentrations and proportions of said solutions being such that the liquid gel forming mass sets without precipitation to a hydrogel and the amount of the "fines" being such as to not exceed 25% of the oxide content of the gel forming mass, and converting the hydrogel into a hard, porous gel.

8. The process according to claim 7 wherein the solutions of substances are an acid and a silicate.

9. The process of preparing an adsorbent material consisting in incorporating activated carbon "fines" of a size finer than 300 mesh in an acid solution, adding a water glass solution thereto with agitation, the solutions being of such concentrations and proportions that the entire mass sets without precipitation to a hydrogel and the amount of the "fines" being such as to not exceed 25% of the silica content of the hydrogel, allowing the mass to set to a hydrogel, and then nearly dehydrating the same.

10. An adsorbent material comprising an inorganic gel and activated carbon "fines" of a size finer than 300 mesh associated therewith, the said "fines" being present in an amount not exceeding 25% of the total amount of the gel.

11. The product according to claim 10 wherein the inorganic gel is silica.

12. An adsorbent material containing 80% to 90% of an inorganic gel and 10% to 20% of activated carbon "fines" finer than 300 mesh.

13. The product according to claim 12 wherein the inorganic gel is silica.

In testimony whereof I hereunto affix my signature.

GERALD C. CONNOLLY.